United States Patent
Takahashi et al.

(10) Patent No.: US 9,437,904 B2
(45) Date of Patent: Sep. 6, 2016

(54) LITHIUM ION SECONDARY BATTERY

(71) Applicant: Kabushiki Kaisha Toshiba, Minato-ku (JP)

(72) Inventors: Kenichi Takahashi, Kanagawa (JP); Hirokiyo Mamyoda, Nagano (JP); Tatsuya Hashimoto, Nagano (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 161 days.

(21) Appl. No.: 14/186,451

(22) Filed: Feb. 21, 2014

(65) Prior Publication Data
US 2014/0170449 A1    Jun. 19, 2014

Related U.S. Application Data

(63) Continuation of application No. PCT/JP2013/057449, filed on Mar. 15, 2013.

(30) Foreign Application Priority Data

Mar. 15, 2012  (JP) ................................. 2012-059023

(51) Int. Cl.
*H01M 10/637* (2014.01)
*H01M 10/0587* (2010.01)
*H01M 2/34* (2006.01)
(Continued)

(52) U.S. Cl.
CPC ......... *H01M 10/5026* (2013.01); *H01M 2/348* (2013.01); *H01M 10/0587* (2013.01); *H01M 10/637* (2015.04); *H01M 10/052* (2013.01); *H01M 2200/10* (2013.01); *H01M 2200/103* (2013.01); *H01M 2220/20* (2013.01); *H02J 2007/0037* (2013.01)

(58) Field of Classification Search
None
See application file for complete search history.

(56) References Cited

U.S. PATENT DOCUMENTS

| 4,188,460 A * | 2/1980 | Kang ............... H01M 2/348 429/7 |
|---|---|---|
| 4,975,341 A | 12/1990 | Tucholski et al. |
| 2006/0275653 A1 | 12/2006 | Chang et al. |

(Continued)

FOREIGN PATENT DOCUMENTS

| CN | 201226364 Y | 4/2009 |
|---|---|---|
| CN | 101826611 A | 9/2010 |

(Continued)

OTHER PUBLICATIONS

U.S. Appl. No. 14/186,753, filed Feb. 21, 2014, Takahashi et al.

(Continued)

*Primary Examiner* — Patrick Ryan
*Assistant Examiner* — Wyatt McConnell
(74) *Attorney, Agent, or Firm* — Oblon, McClelland, Maier & Neustadt, L.L.P.

(57) ABSTRACT

A lithium ion secondary battery has a battery can, an electrode assembly in the battery can formed by rolling up a positive electrode, a separator, and a negative electrode, an organic electrolyte solution in the battery can, a positive electrode lead in the battery can connected to the positive electrode, a negative electrode lead in the battery can connected to the negative electrode, an overcharge preventer, a cap body sealing the battery can, a positive electrode terminal fixed to the cap body and connected to the positive electrode lead, and a negative electrode terminal fixed to the cap body and connected to the negative electrode lead.

6 Claims, 6 Drawing Sheets

(51) Int. Cl.
*H01M 10/052* (2010.01)
*H02J 7/00* (2006.01)

(56) References Cited

U.S. PATENT DOCUMENTS

| | | | | |
|---|---|---|---|---|
| 2008/0116851 | A1* | 5/2008 | Mori | H01M 2/34 320/134 |
| 2010/0227205 | A1 | 9/2010 | Byun et al. | |
| 2011/0177387 | A1 | 7/2011 | Byun et al. | |
| 2012/0251851 | A1* | 10/2012 | Kim | H01M 2/043 429/61 |

FOREIGN PATENT DOCUMENTS

| | | |
|---|---|---|
| CN | 101997133 A | 3/2011 |
| JP | 10-326610 A | 12/1998 |
| JP | 2000-294226 A | 10/2000 |
| JP | 2002-95157 A | 3/2002 |
| JP | 2006-185708 A | 7/2006 |
| JP | 2007-80791 A | 3/2007 |
| JP | 2008-541374 A | 11/2008 |
| JP | 2008-311106 A | 12/2008 |
| JP | 2010-205728 A | 9/2010 |

OTHER PUBLICATIONS

Office Action issued on Nov. 18, 2014 in the corresponding Japanese Patent Application No. 2014-505032 (with English Translation).
International Search Report issued on May 14, 2013 for PCT/JP2013/057449 filed on Mar. 15, 2013 with English Translation.
Extended European Search Report issued on Oct. 20, 2015 in European Patent Application No. 13760303.1.
Combined Chinese Office Action and Search Report issued Jun. 23, 2015 in Patent Application No. 201380002398.6 (with English language translation).
Office Action mailed Feb. 29, 2016 in Chinese Patent Application No. 201380002398.6 (with English Translation).

* cited by examiner

LITHIUM ION SECONDARY BATTERY

CROSS-REFERENCE TO RELATED APPLICATION

This application is a continuation application (CA) based upon and claims the benefit of priority from Japanese Patent Application No. 2012-059023, filed on Mar. 15, 2012; and International Application PCT/JP2013/057449, the International Filing Date of which is Mar. 15, 2013 the entire contents of which are incorporated herein by reference.

FIELD

Embodiments described herein relate generally to a lithium ion secondary battery.

BACKGROUND

In recent years, automobiles using secondary batteries as energy sources have been put into practical use, for the reduction of carbon-dioxide emissions, concern over the depletion of fossil fuels such as gasoline. The secondary batteries are required to be high in output power, high in energy density, reduced in size and weight, low in price, or the like, and the improvement in safety and durability is also indispensable for the secondary batteries.

Lithium ion secondary batteries are known as high energy-density secondary batteries for automobiles. The high energy-density lithium ion secondary battery typically has an electrode assembly obtained by rolling up a positive electrode and a negative electrode stacked with a separator interposed therebetween, impregnated with an organic electrolyte solution, and enclosed in a battery can.

Because of the use of an organic electrolyte solution in the lithium ion secondary battery, in the case of reaching an overcharge condition, there is a possibility of not only increasing the battery voltage, but also increasing the pressure gas inside the battery, and further increasing the temperature in the battery, thereby leading to situations such as leakage of the electrolyte solution and rupture of the can. The secondary batteries for automobiles are expected to be subjected to the frequent repetition of charge and discharge, and measures against overcharge are thus taken to ensure safety.

As a measure against overcharge, for example, it is known that a heat generation unit is allowed to generate heat in the case of overcharge, and the container is opened with the heat to release gas during the overcharge.

DETAILED DESCRIPTION

Figure 1:
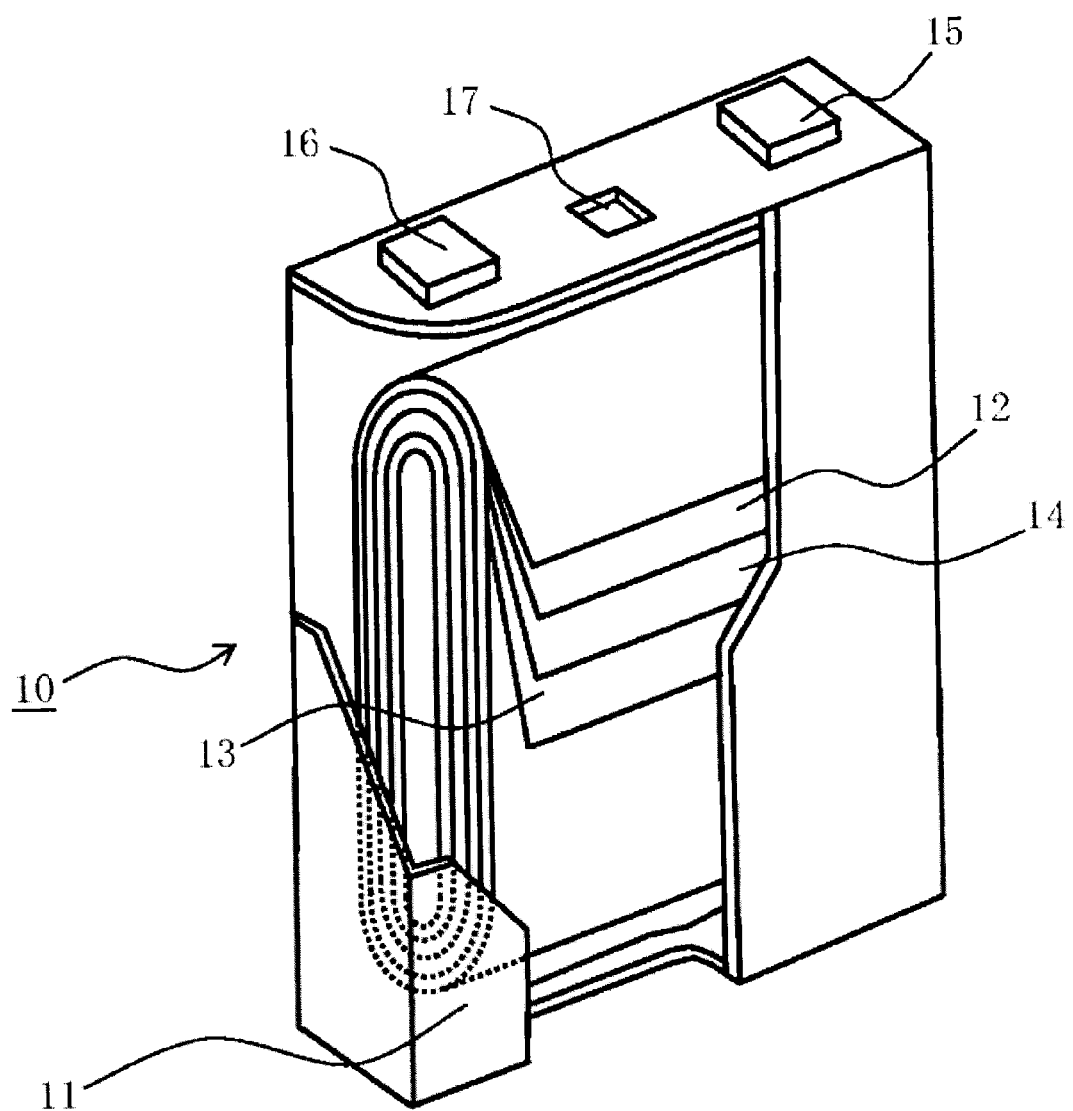
FIG. 1 is a partially cutaway perspective view illustrating a lithium ion secondary battery example according to an embodiment.

A lithium ion secondary battery according to an embodiment has: a battery can; an electrode assembly in the battery can formed by rolling up a positive electrode, a separator, and a negative electrode; an organic electrolyte solution in the battery can; a positive electrode tab in the battery can connected to the positive electrode; a negative electrode tab in the battery can connected to the negative electrode; an overcharge preventer in the battery can; a cap body sealing the battery can; a positive electrode terminal fixed to the cap body and connected to the positive electrode tab; and a negative electrode terminal fixed to the cap body and connected to the negative electrode tab.

Further, the overcharge preventer includes: a temperature-sensitive deformation member configured to detect the internal temperature of the electrode assembly to undergo shape change; a switch member configured to be driven by the shape change of the temperature-sensitive deformation member; a fuse member connected in series between the positive electrode terminal and the positive electrode or the negative electrode terminal and the negative electrode; and a short circuit configured to connect the electrode assembly, the fuse member, and the switch member of the lithium ion secondary battery.

In the operation of the overcharge preventer, in the case of battery overcharge, the battery body undergoes an increase in temperature, as a result, the temperature-sensitive deformation member undergoes a shape change, and a push rod provided in contact with the temperature-sensitive deformation member pushes the switch member to turn on the switch member. As a result, the short circuit becomes a closed circuit, and the fuse member is melted down by electrical energy accumulated in the electrode assembly, to shut off the charging current path.

The temperature-sensitive deformation member is preferably composed of at least one of a shape-memory alloy, a bimetal, and a wax. The member is further preferably a shape-memory alloy. The shape of the shape-memory alloy is preferably a C-shaped ring.

The short circuit is preferably partially routed through the battery can. In addition, the fuse member can be composed of a thin part formed on the positive electrode lead or negative electrode lead.

The switch member includes: a switch unit composed of a lead-like member opposed to the battery can and the battery can; a spring placed near the lead-like member; a spring locking member; and a push rod-like member configured to push out the spring locking member, the spring is compressively fixed by the locking member, in the case of overcharge, the compression of the spring is released in association with the movement of the push rod-like member depending on a deformation of the temperature-sensitive deformation member, and the repulsion force of the spring instantaneously brings the lead-like member and the battery can into contact with each other to close the short circuit, and melt down the fuse member.

When the container is opened to release gas as described above, an organic solvent contained in the organic electrolyte solution in the battery will be released to the air to pollute the environment. In addition, because the charging current remains to flow after opening the container, the charging condition will last, and there is also a possibility that the situation will be further worsened.

The embodiments are aimed at achieving a highly reliable battery which ensure that overcharge conditions can be prevented without any harmful effects on the outside.

The lithium ion secondary battery according to the present embodiment will be described below in detail with reference to the drawings.

[Structure]

FIG. 1 illustrates, in the partially cutaway perspective view therein, a structure example of the lithium ion secondary battery according to the present embodiment.

As seen in FIG. 1, the battery 10 includes a battery can 11 in the shape of a hollow circular cylinder with a bottom, a hollow cuboid with a bottom, or a hollow cube with a bottom, which includes an opening, and the opening includes a cap body 18 placed for sealing the opening. This cap body 18 is provided with terminals 15, 16 for electric current extraction, which are connected to a positive electrode 12 and a negative electrode 13 inside via electrode leads 22, 23 such as aluminum foil. The positive electrode 12 and the negative electrode 13 are formed by applying a positive electrode active material and a negative electrode active material respectively on surfaces of thin metal foil. Between the both electrodes, an ion-permeable separator 14 for insulation is stacked on one another, rolled up, shaped so as to be able to be housed in the can body 11 to make up an electrode assembly, which is housed in the battery can 11 along with an electrolyte solution, not illustrated.

The cap body 18 at the opening of the battery can 11 can be further provided with a gas release valve 17, so as to be able to release internal gas when the internal pressure in the battery is increased.

In the present embodiment, a means that detects and deals with overcharge conditions can be achieved without using any electronic circuits. Therefore, it becomes possible to achieve a highly reliable overcharge preventer without any possibility of electronic circuit corrosion or the like in such a condition as under an atmosphere of an organic electrolyte solution.

Each configuration requirement will be further described below.

(Battery Can)

The battery can 11 has the shape of a hollow circular cylinder with a bottom, a hollow cuboid with a bottom, or a hollow cube with a bottom, which includes an opening, which is obtained by shaping a metal such as aluminum. The battery can 11 filled inside with an organic electrolyte solution, can be made of such a material that is not chemically reacted with the organic electrolyte solution, or subjected inside to resin coating for insulation.

(Cap Body)

The cap body 18 is formed from an insulating plate material such as polypropylene for insulating the inside from the aluminum plate constituting the exterior unit, and hermetically fixed to the opening of the battery can 11 by means such as a swage. The cap body 18 includes at least two openings formed, which are respectively provided with the positive electrode terminal 15 and the negative electrode terminal 16. Furthermore, if necessary, the cap body 18 may be provided with the gas release valve 17 that releases gas when the internal pressure is increased.

(Electrode Assembly)

The electrode assembly is formed in such a way that the positive electrode 12, the negative electrode 13, and the separator 14 can be stacked on one another, rolled up, and housed in the battery can 11 as described previously.

The positive and negative electrodes 12, 13 of the electrode assembly have ends formed by rolling up so as to be protruded from the separator 14, tabs 22, 23 for electrode extraction are electrically connected to the protruded positive and negative electrodes by means such as welding, and the tabs 22, 23 are electrically connected to the positive and negative electrode terminals 15, 16 of the cap body.

(Positive Electrode)

The positive electrode is prepared by, for example, applying slurry containing a positive electrode active material to a current collector of aluminum foil or aluminum alloy foil. As the positive electrode active material, which is not to be considered particularly limited, oxides, sulfides, polymer, and the like can be used which can store and release lithium. Preferred active materials include such as lithium-manganese complex oxides, lithium-nickel complex oxides, lithium-cobalt complex oxides, and lithium iron phosphate, which achieves high positive electrode potentials.

(Negative Electrode)

The negative electrode is prepared by applying slurry containing a negative electrode active material to a current collector of aluminum foil or aluminum alloy foil.

As the negative electrode active material, which is not to be considered particularly limited, metal oxides, metal sulfides, metal nitrides, alloys, and the like can be used which can store and release lithium, and preferably, the negative electrode active material is a material that has an electric potential of 0.4 V or higher for storing or releasing lithium ions with respect to the electric potential of metal lithium. This negative electrode active material which has an electric potential for storing or releasing lithium ions suppresses the alloying reaction between aluminum or an aluminum alloy and lithium, thereby allowing the use of aluminum or an aluminum alloy for the negative current collector and constituent members related to the negative electrode. Examples thereof include, for example, titanium oxides, lithium-titanium oxides, tungsten oxides, amorphous tin oxides, tin-silicon oxides, and silicon oxides, and above all, lithium-titanium complex oxides are preferred.

(Separator)

Microporous membranes, woven fabrics, non-woven fabrics, laminated products of the same material or different materials thereof, and the like can be used as the separator. Examples of the material forming the separator can include such as polyethylene, polypropylene, ethylene-propylene copolymers, and ethylene-butene copolymers.

(Electrolyte Solution)

For the electrolyte solution, a non-aqueous electrolyte solution is used which is prepared by dissolving an electrolyte (for example, a lithium salt) in a non-aqueous solvent. Examples of the non-aqueous solvent can include such as, for example, ethylene carbonate (EC), propylene carbonate (PC), butylene carbonate (BC), dimethyl carbonate (DMC), diethyl carbonate (DEC), ethylmethyl carbonate (EMC), γ-butyrolactone (γ-BL), sulfolane, acetonitrile, 1,2-dimethoxyethane, 1,3-dimethoxypropane, dimethyl ether, tetrahydrofurane (THF), 2-methyltetrahydrofuran. The non-aqueous solvents may be used independently, or two or more thereof may be mixed for use. Examples of the electrolyte can include lithium salts such as, for example, lithium perchlorate ($LiClO_4$), lithium hexafluorophosphate ($LiPF_6$), lithium tetrafluoroborate ($LiBF_4$), lithium hexafluoroarsenate ($LiAsF_6$), and lithium trifluoromethanesulfonate ($LiCF_3SO_3$). The electrolytes may be used independently, or two or more thereof may be mixed for use. The amount of the electrolyte dissolved in the non-aqueous solvent is desirably 0.2 mol/L to 3 mol/L.

The materials mentioned for the positive electrode, negative electrode, separator, or organic electrolyte solution are absolutely by way of example only, and the present embodiment is not to be considered limited to these materials.

(Overcharge Preventer)

The overcharge preventer according to the present embodiment includes: a temperature-sensitive deformation member configured to detect the internal temperature of the electrode assembly to undergo shape change; a switch member configured to be driven by the shape change of the temperature-sensitive deformation member; a fuse member connected in series to a positive electrode or negative electrode external electrode terminal and a positive or negative electrode; and a short circuit configured to connect the electrode assembly, the fuse member, and the switch member of the lithium ion secondary battery.

Further, in the case of lithium ion secondary battery overcharge, the battery body undergoes an increase in temperature, as a result, the temperature-sensitive deformation member undergoes a shape change, and a push rod provided in contact with the temperature-sensitive deformation member pushes the switch member to turn on the switch member. As a result, the short circuit becomes a closed circuit, and the fuse member is melted down by energy accumulated in the electrode assembly, to shut off the charging current path.

The overcharge preventer will be described below with reference to examples.

Example 1

The overcharge preventer according to the present example will be described below with reference to FIGS. 2A to 2C. It is to be noted that the description of what is illustrated in FIG. 1 will be omitted.

Figure 2A:
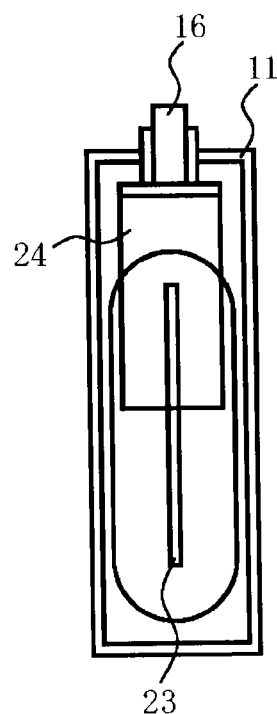
FIGS. 2A to 2C are diagrams schematically illustrating a lithium ion secondary battery according to Example 1.
Figure 2B:
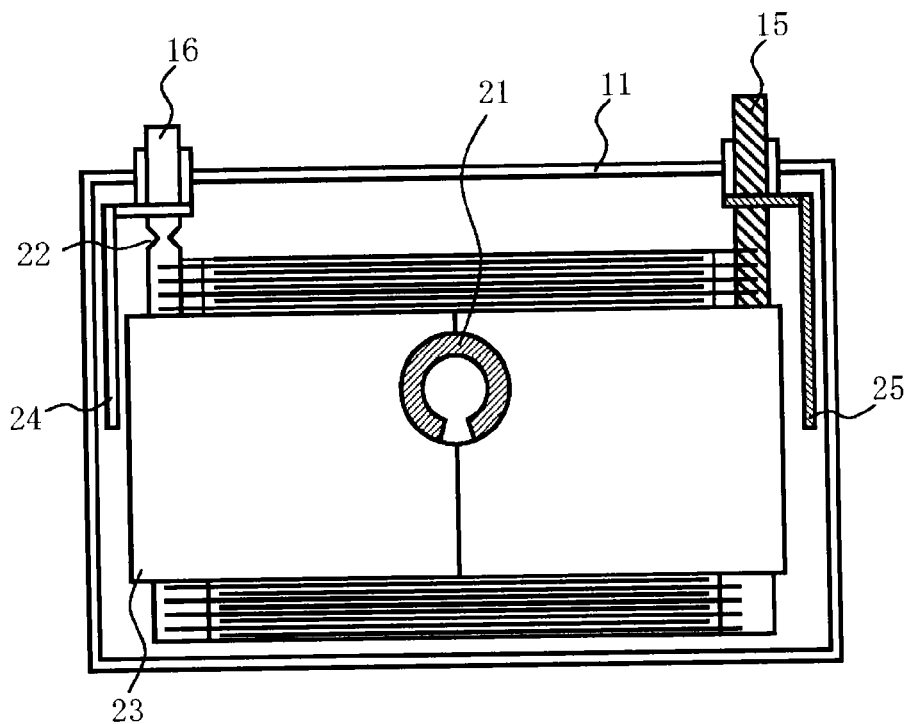
Figure 2C:
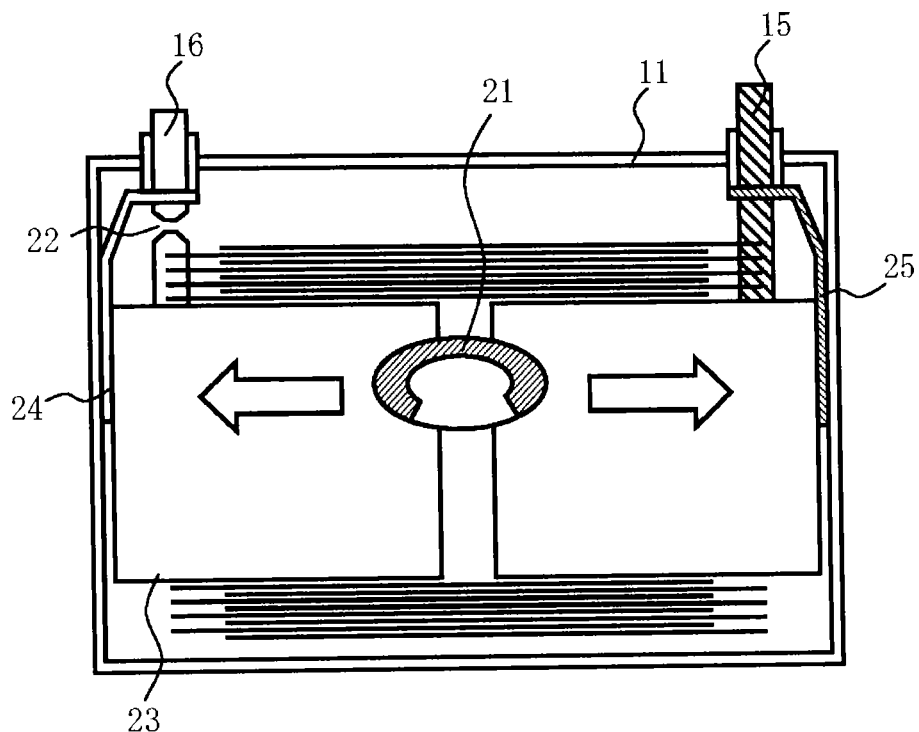

FIGS. 2A to 2C are cross-sectional views of a lithium ion secondary battery according to the present example, where FIG. 2A is a side cross-sectional view, whereas FIGS. 2B and 2C are front cross-sectional views. In addition, FIGS. 2A and 2B are diagram in the case of normal charge, where FIG. 2C is a diagram in the case of abnormal charge.

This example is an example of using a shape-memory member in the shape of a C-shaped ring as the temperature-sensitive deformation member. In the case of the lithium-ion secondary battery, it is the inside of the electrode assembly where the temperature is most increased in an overcharge condition, and it is preferable to place the temperature-sensitive deformation member inside the battery.

As seen in FIG. 2B, a temperature-sensitive deformation member 21 is placed in contact with a pair of lead push members 23 inside the electrode assembly. These lead push members 23 are placed to surround and support the shape-memory member. Lead-like members 24, 25 are placed between the lead push members 23 and the battery can 11, which are respectively connected to an external positive electrode terminal 16 and an external negative electrode terminal 15. The shape-memory member 21 is shaped by compressive fixation, with compressive strain remaining.

In the case of reaching an overcharge condition during the battery charging, the increased temperature of the battery body releases the compressive strain of the shape-memory member 21, restores the shape of the shape-memory member 21, and pushes the push rod-like bodies 23 to move the push rod-like bodies 23 for sliding in the horizontal direction illustrated. As a result, the lead-like members 24, 25 are brought into contact with the battery can 11 to cause short circuit. Then, the short circuit that connects the fuse member 22, the lead-like member 24, the battery can 11, the lead-like member 25, and the electrode assembly is closed from the electrode assembly, a large current is allowed to flow by electrical energy accumulated in the electrode assembly, and at the fuse unit 22, the fuse is melted down by an increase in temperature due to the resistance. As a result, the charging current path is shut off to resolve the overcharge condition.

Example 2

The present example will be described with reference to FIGS. 3A to 3C which are schematic cross-sectional views of a lithium ion secondary battery according to Example 2.

Figure 3A:
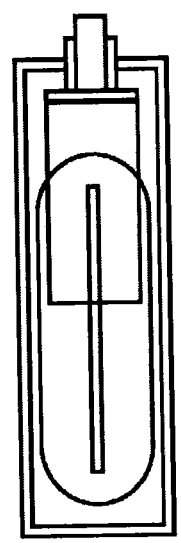
FIGS. 3A to 3C are diagrams schematically illustrating a lithium ion secondary battery according to Example 2.
Figure 3B:
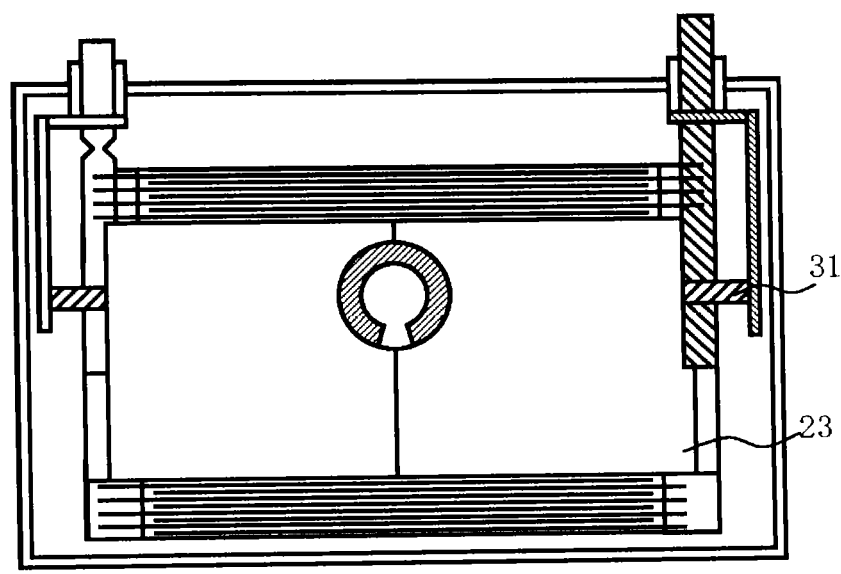
Figure 3C:
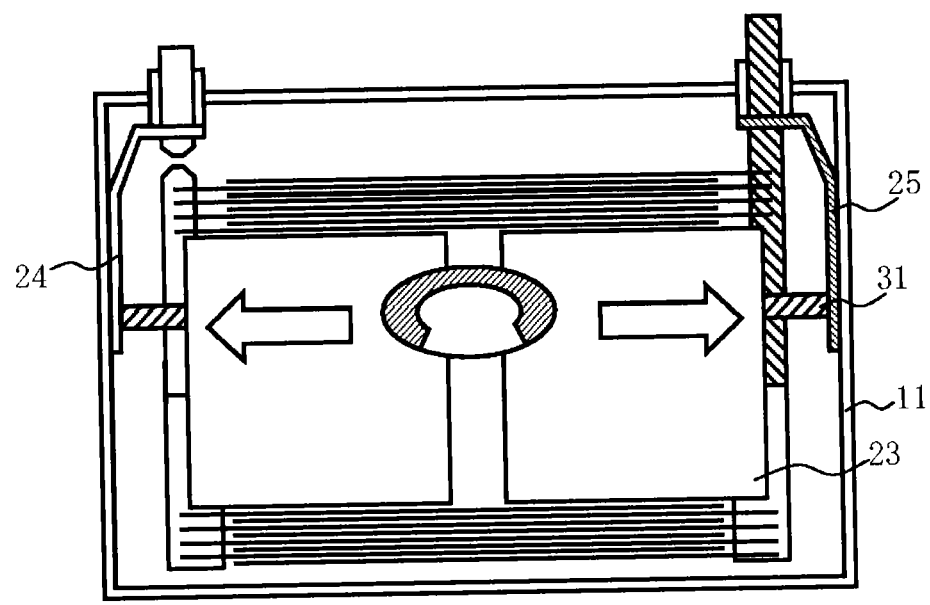

FIGS. 3A to 3C are schematic cross-sectional views of a lithium ion secondary battery, as with FIGS. 2A to 2C. The difference of Example 2 from Example 1 described above is that the lead push members 23 push the lead-like members 24, 25, thereby resulting in short circuit between the lead-like members 24, 25 and the battery can 11 in Example 1. In Example 2, a relatively light rod-like member 31 is placed between lead push members 23 and lead-like members 24, 25.

As just described, in Example 2, the use of the rod-like member 31 reduce the mass of a member to be moved in the case of falling into an overcharge condition, and as a result, ensures that a switch member can be also driven by the restoring force of a small shape-memory member, thereby making it possible to further ensure the achievement of the operation for overcharge prevention.

Example 3

Figure 4A:
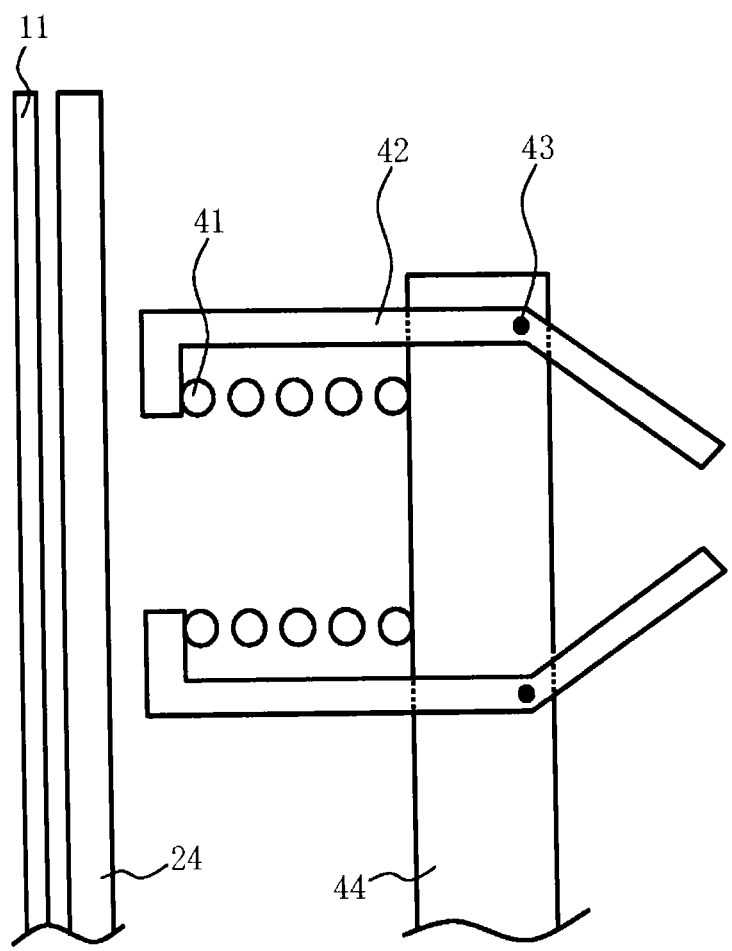
FIGS. 4A and 4B are diagrams schematically illustrating a lithium ion secondary battery according to Example 3.
Figure 4B:
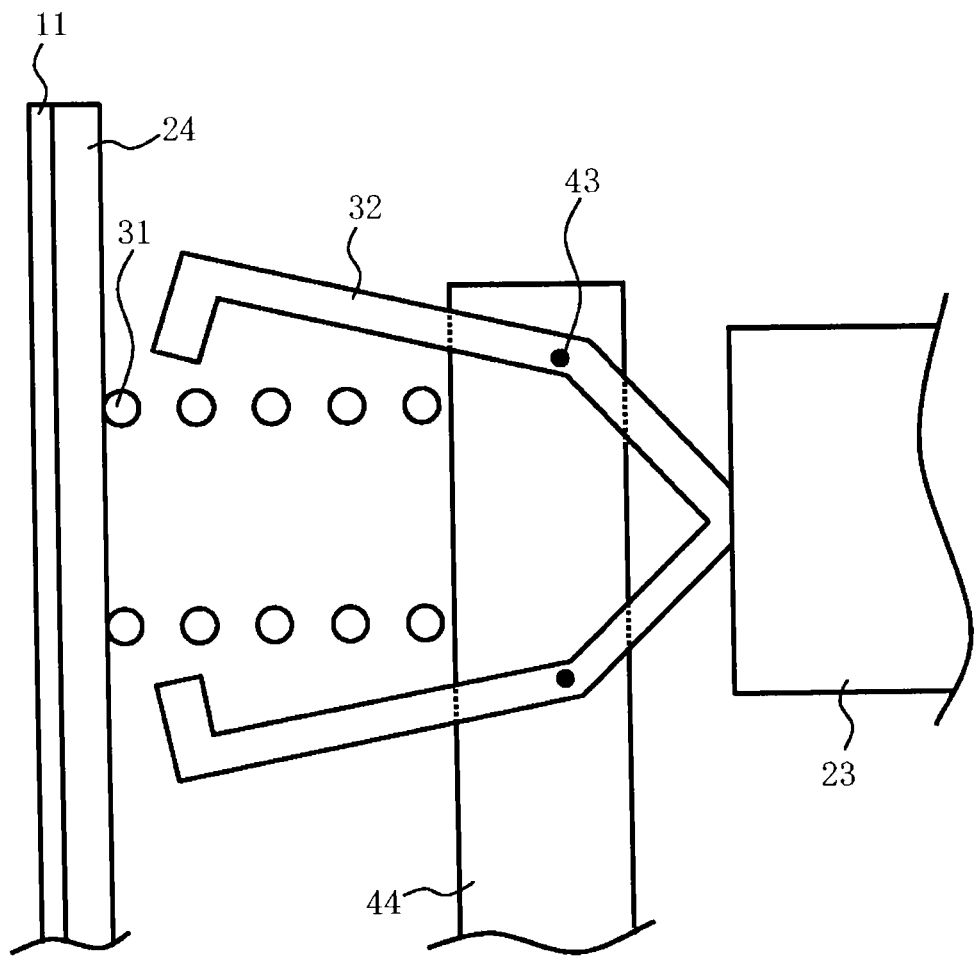

Example 3 will be described with reference to FIGS. 4A and 4B illustrating a main part of an overcharge preventer.

FIGS. 4A and 4B are schematic diagrams illustrating an enlarged portion near a switch member. FIG. 4A is a diagram in the case of normal charge, where FIG. 4B is a diagram in the case of abnormal charge.

In FIG. 4A, a spring 31 is locked and compressed by a supporting member (not illustrated) fixed to a battery can and a spring holder 42. The spring holder 42 is a member attached rotatably around a support shaft 43 on the supporting member (not illustrated), and it is preferable to lock the spring 41 with two or more spring holders 42.

In the case of abnormal charge, when the temperature of the electrode assembly in the battery body is increased to slide lead push members 23 in the horizontal direction and push out the lead push members, tips of the spring holder 42 on the battery can side move in opening directions to release the lock on the spring 41 as seen in FIG. 4B. As a result, the spring 31 instantaneously pushes a lead-like member 24 to cause short circuit between the lead-like member 24 and the battery can 11. In this way, the short circuit is closed to melt down a fuse member, not illustrated in FIG. 4A or 4B, and interrupt the charging current.

While the several embodiments and examples of the present invention have been described above, these embodiments are presented by way of example, and not intended to limit the scope of the invention. The embodiments can be implemented in various other ways, and various omissions, substitutions, and modifications can be made without departing from the spirit of the invention. The embodiments and variations thereof are considered to fall within the scope and spirit of the invention, as well as within the invention as set forth in the claims and equivalents thereof.

What is claimed is:

1. A lithium ion secondary battery comprising:
a battery can:
an electrode assembly in the battery can formed by rolling up a positive electrode, a separator, and a negative electrode;

an organic electrolyte solution in the battery can;
a positive electrode tab in the battery can connected to the positive electrode;
a negative electrode tab in the battery can connected to the negative electrode;
an overcharge preventer in the battery can;
a cap body sealing the battery can;
a positive electrode terminal fixed to the cap body and connected to the positive electrode tab; and
a negative electrode terminal fixed to the cap body and connected to the negative electrode tab,
wherein the overcharge preventer comprises: a temperature-sensitive deformation member configured to detect the internal temperature of the electrode assembly to undergo shape change; a switch member configured to be driven by the shape change of the temperature-sensitive deformation member; a fuse member connected in series between the positive electrode terminal and the positive electrode or the negative electrode terminal and the negative electrode; and a short circuit configured to connect the electrode assembly, the fuse member, and the switch member, and when the switch member is driven and turned on by the shape change of the temperature-sensitive deformation member, the short circuit becomes a closed circuit, and the fuse member is melted down by electrical energy accumulated in the electrode assembly to shut off a charging current path,
wherein the switch member comprises at least one of a positive electrode lead member and a negative electrode lead member,
the positive electrode lead member is connected to the positive electrode tab,
the negative electrode lead member is connected to the negative electrode tab,
when the short circuit is not closed before the shape change of the temperature-sensitive deformation member, the positive electrode lead member and the negative electrode lead member are not connected to the battery can,
when the switch member is driven and turned on by the shape change of the temperature-sensitive deformation member, and the positive electrode lead member and the negative electrode lead member are connected to the battery can forced by the shape change of the temperature-sensitive deformation member, the short circuit becomes a closed circuit, and the fuse member is melted down by electrical energy accumulated in the electrode assembly to shut off a charging current path.

2. The battery according to claim 1, wherein the temperature-sensitive deformation member comprises at least one of a shape-memory alloy, a bimetal, and a wax.

3. The battery according to claim 1, wherein the short circuit comprises two switch members in contact with the battery can, and when the short circuit is a closed circuit, a short-circuit current passes through the battery can.

4. The battery according to claim 1, wherein the fuse member comprises a thin part formed on either a positive electrode lead or a negative electrode lead extracted from the electrode assembly, and the thin part is thinner than one or more other portion of the lead.

5. The battery according to claim 1, wherein the switch member further comprises: a spring a spring locking member; and a push rod member configured to push out the spring locking member, the spring is compressively fixed by the locking member, in the case of overcharge, the compression of the spring is released in association with a movement of the push rod member depending on a deformation of the temperature-sensitive deformation member, and a repulsion force of the spring instantaneously brings the switch member and the battery can into contact with each other to close the short circuit, and melt down the fuse member.

6. The battery according to claim 1, wherein the temperature-sensitive deformation member has a substantially C-ring shape formed from a shape-memory alloy.

* * * * *